Jan. 30, 1968      D. E. WILLIAMSON      3,366,003
PHOTOGRAPHIC APPARATUS

Filed Nov. 23, 1964      3 Sheets-Sheet 1

INVENTOR.
DONALD E. WILLIAMSON
BY
Kenway, Jenney & Hildreth
ATTORNEYS

INVENTOR.
DONALD E. WILLIAMSON
BY
Kenway, Jenney & Hildreth
ATTORNEYS

Jan. 30, 1968  D. E. WILLIAMSON  3,366,003
PHOTOGRAPHIC APPARATUS

Filed Nov. 23, 1964  3 Sheets-Sheet 3

INVENTOR.
DONALD E. WILLIAMSON
BY
ATTORNEYS

United States Patent Office 3,366,003
Patented Jan. 30, 1968

3,366,003
PHOTOGRAPHIC APPARATUS
Donald E. Williamson, Miami, Fla., assignor to Cordis Corporation, Miami, Fla., a corporation of Florida
Filed Nov. 23, 1964, Ser. No. 412,941
20 Claims. (Cl. 88—24)

This invention relates to the photography of laboratory testing media, and provides a camera for that purpose.

Several analytic and diagnostic techniques make use of visible test effects that take place in transparent media such as gels and liquids. Immunodiffusion for instance frequently depends on the appearance of a precipitate in a gel when an antibody and its antigen react together. Electrophoresis techniques commonly result in the separation of a given sample into components which visibly appear as separate bands. A variety of techniques depend on spot tests in which test samples are arranged in cells in a transparent plate, and a test reagent is added to produce a visible effect.

In the evaluation, analysis and recording of these procedures it is common practice to photograph the analytical samples, sometimes successively at spaced time intervals.

Heretofore photographic recording systems have been limited to standard photographic equipment, usually a camera mounted vertically over a transparent stage with lamps beneath the stage set well away from the optical axis of the camera so that the background field will appear dark.

Such an arrangement is cumbersome and fails to give optimal results. Where a large scale picture is required, as in photographing closely spaced parallel bands which characterize certain electrodialysis techniques, the camera must be moved quite close to the object, frequently with the addition of an auxiliary close-up lens. The result is that the parallel bands at the edge of the field are viewed from a relatively acute angle and overlap like a Venetian blind viewed at an angle to the slats, so that the separate bands cannot be distinguished.

It is of course possible to photograph from a greater distance onto a fine grain film and enlarge the picture, but that would require much greater time and manipulation.

Ordinarily a particular installation will be employed for use at several scales, large and small, which requires that the camera be moved closer or farther, and then focused and reset as to aperture and shutter speed for the then prevailing illumination. These operations are cumbersome and time consuming, and the results depend on the photographic talent of the operator whose main interests lie in the object being photographed rather than the art of photography.

Another problem is encountered when a liquid specimen is to be photographed, as in certain spot test procedures carried out on a glass plate having columns and rows of small cells containing test samples and reagent. The liquid surface, because of its meniscus, produces distortion of the detail under study.

This invention provides a novel camera for fixed position photography in transparent and liquid media which eliminates or minimizes the difficulties and inconveniences described above, and which is simple to operate by persons unskilled in photography, is compact, self-contained and portable, so that its demands on laboratory space are small.

In particular the camera of this invention provides for the photography of liquid samples without distortion from a free liquid surface. It provides for photography at various scales, which may be selected by a single manipulation without necessitating the resetting of exposure and aperture. It also provides better resolution between closely spaced bands than have generally been obtainable by conventional equipment in a single photographic step (without enlargement). In addition, the background illumination available in the camera of this invention may be either white field or dark field, and in the latter case this invention eliminates certain distortive effects that are otherwise generally encountered. The camera of this invention incorporates a number of features which singly or in combination produce a valuable new tool for laboratory work.

In one aspect this camera features a transparent stage with an illuminating lamp mounted over it and a camera system below it to photograph the object from the bottom. This produces an image which is free from optical distortion caused by the surface configuration of the object, and, as the bottom surface will generally be flat, little or no distortion of the image is present. In addition, the optical system makes use of an odd number of reflective surfaces, such as mirrors, so that the image, although viewed from the bottom has the handedness of the top and may be more easily compared and correlated with the object.

In another aspect the camera of this invention features a fixed stage, shutter, and film holder, and employs interchangeable lenses for varying scales or degrees of magnification, mounted at locations appropriate to their focal lengths, including a high magnification lens situated between the object and shutter, and a lower magnification lens situated between the shutter and film holder. A single shutter is thus used for two distinct optical arrangements, at a location remote from optical center, but where the combined image beams are optimally the smallest. Although the shutter at this location is field limiting, and might provide somewhat more illumination at the center than at the edges, such an effect is substantially eliminated by utilizing a relatively small aperture and slow exposure in which the time during which the shutter is opening and closing is small in comparison with the total exposure.

The interchangeable lenses are preferably all of the same f/number. The object and image remain at the same location and interchanging the lenses requires no resetting of the exposure. By employing a long focal length lens (of 20 inches) for high magnification (and longer for low magnification), the object is viewed from a distance giving superior resolution to closely spaced bands.

Illumination of the object is provided by a circular source of light which surrounds a circular shielding having a black looking center. This results in uniform dark field illumination from all sides and avoids certain distortions or shadowy effects which have been previously encountered.

A preferred embodiment of the invention which incorporates the features and fulfills the objects described above is shown in the accompanying drawings in which.

Figure 1:
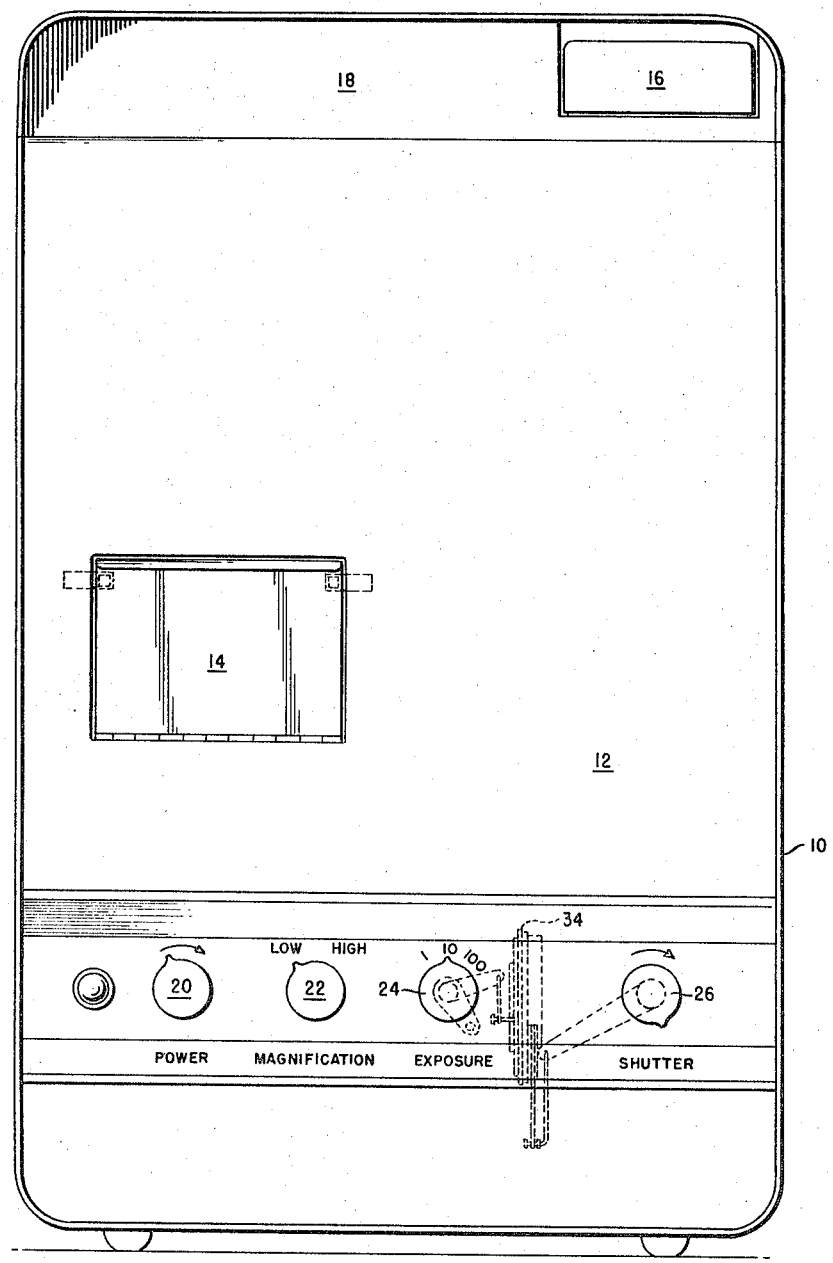
FIG. 1 is a front elevation of the camera of this invention, in which the shutter mechanism within the device and the connection to operating knobs are indicated.
Figure 2:
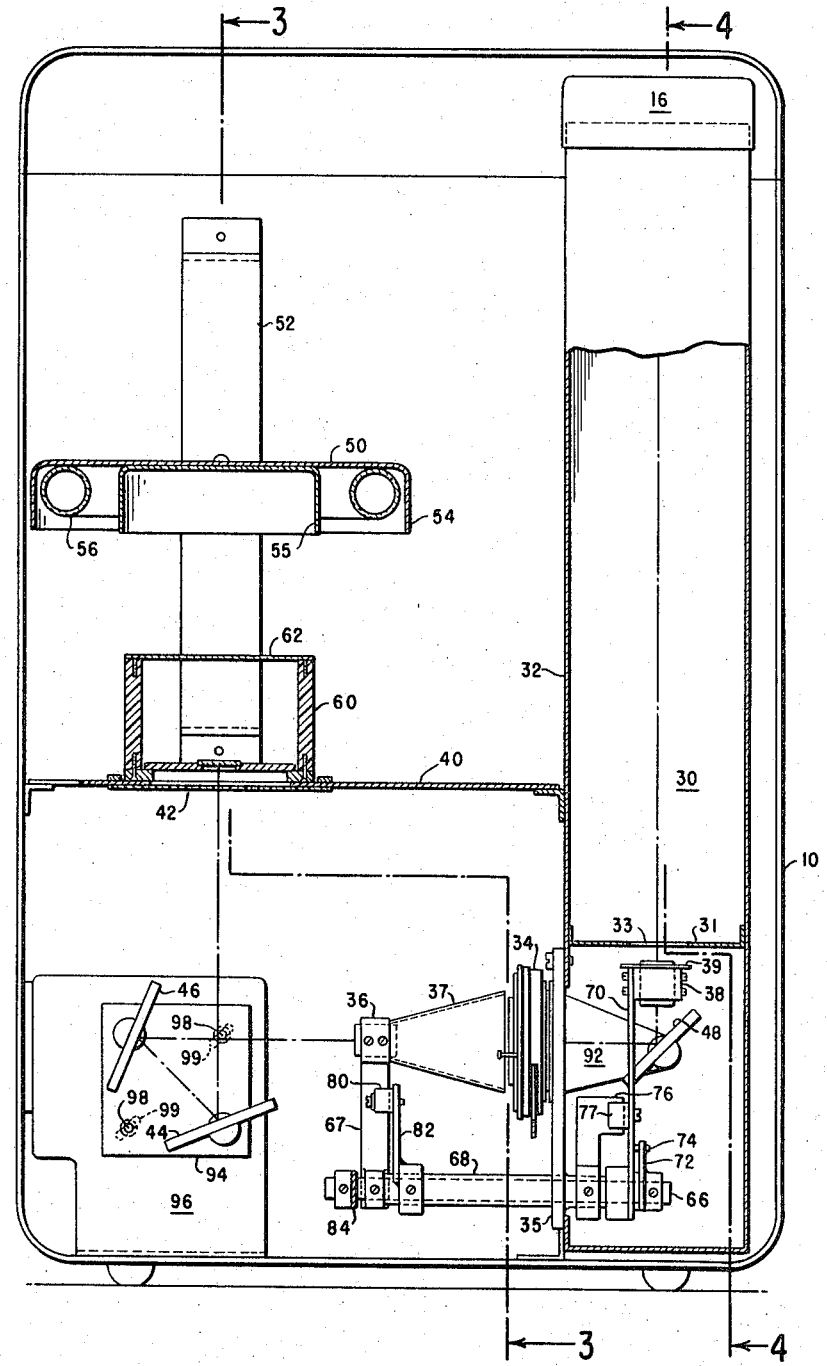
FIG. 2 is a front elevation of the device in which the front panel has been removed, partly in section to reveal structural details.

In its general organization the camera is a self-contained unit constructed in a housing made up of a base member 10, and a front panel 12 having a door 14 through which objects to be photographed may be inserted. At the top and on the side opposite the door is a film holder 16, conveniently a Polaroid film-pack type holder which may be operated entirely from the front of the device. A hinged cover 18 encloses the top of the housing and provides access for opening the film holder to change the film pack.

The operation of the camera is controlled by four knobs, an On-Off switch 20 for illumination, a magnification selector knob 22, an exposure selector knob 24, and a shutter release knob 26.

Within the housing the principal components are a camera obscura 30, a transparent stage 42, a lamp 50 mounted over the stage, and three mirrors 44, 46 and 48 in the optical path of the camera obscura 30.

The camera obscura 30 consists principally of a tube 32 to the top of which is mounted the film holder 16, and a conventional shutter mechanism 34 which is mounted on a lens board 35 on the side and at the lower end of the tube 32. A high magnification lens 36 with a light shielding cone 37 is mounted outside of the camera tube for positioning in the optical path, and a low magnification lens 38 in a light shielding panel 39 is arranged inside of the camera tube for positioning in the optical path beneath an auxiliary light shield 31 having a circular aperture 33.

A horizontal stage 40 mounted to the base member 10 carries a transparent stage portion 42 of glass or plastic, for the receipt of objects to be photographed. The three mirrors 44, 46 and 48 direct the rays from the object to the film holder and restore to the bottom view the handedness of the top. A pair of mirrors 44 and 46 mounted beneath the transparent stage 42 are arranged at 45° to each other with a plane bisecting them lying 45° from horizontal. These together direct the vertical view from the bottom of the stage 42 to a horizontal image beam along the optical axis of the camera 30. A third mirror 48 within the camera obscura 30 at 45° angle from the horizontal serves to direct the horizontal image beam from the mirror 46 vertically to the film pack 16. The optical axis of the camera, it will be noted, is horizontal to the left of the mirror 48 and vertical between the mirror 48 and the film holder 16.

Illumination of the object is provided by a lamp 50 which is adjustably mounted on a vertical bracket 52 secured to the back of the housing base 10, by means of a screw adjusted clamp 53. The lamp itself consists of an annular channel defined by an outer dish member 54 and an inner dish member 55, secured together concentrically, each having generally vertical, downwardly extending walls between which a circular fluorescent lamp 56 is mounted. The source of illumination is thus kept away from the viewing axis and a black background is provided by blackening the inside surface of the inner dish member 55, which covers the field of view of the camera.

Figure 3:
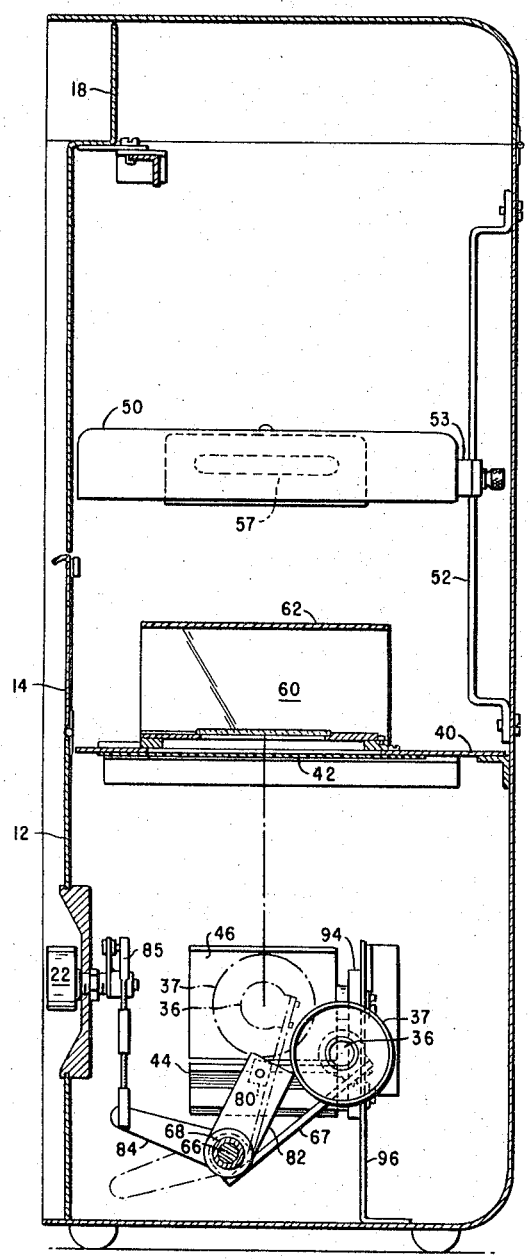
FIG. 3 is a side elevation taken at section 3—3 in FIG. 2.

An additional feature as indicated in FIG. 3 is the inclusion of an electronic flash tube 57 within the inner pan 55 (or elsewhere depending on its geometry) to facilitate certain photographic techniques, particularly in the fields of color photography. The tube, being essentially transparent, does not substantially affect the blackness of the background.

Where white background photography is desired, a removable stage 60 having a white translucent horizontal plate 62 may be placed on the transparent stage 42. The interposition of the white plate 62 horizontally between the lamp 50 and the object on the stage 42 provides a generally uniform white background against which opaque objects may be viewed better than against a dark background.

Figure 4:
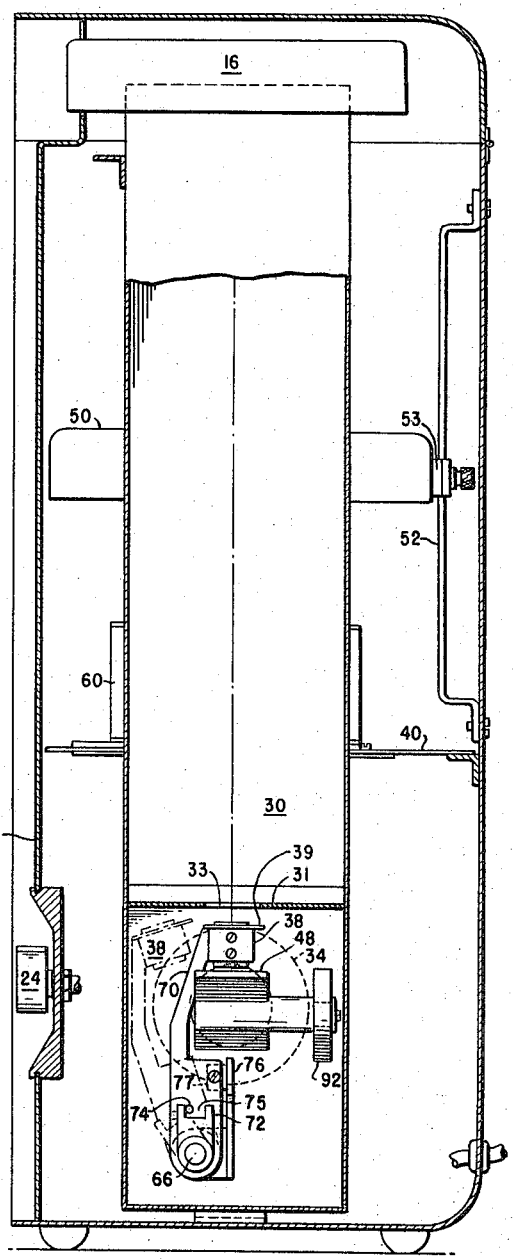
FIG. 4 is a side elevation taken at section 4—4 of FIG. 2.

The interchangeable lenses 36 and 38 are arranged to be swung into position from a shaft 66. This is carried in a sleeve 68 which is mounted on the lens board 35 and extends to both sides. The high magnification lens 36 and shield cone 37 are carried by an arm 67 (see FIG. 3) which is mounted securely to the shaft 66 at the end outside of the camera obscura 30, and the low magnification lens 38 is carried by an arm 70 (see FIG. 4) which is mounted to rotate on the shaft 66, relatively thereto. The arm 70 is controlled by a bifurcated link 72 which is mounted securely to the shaft 66. The link 72 is formed with two stops 73 which engage a pin 74 carried by the arm 70. This arrangement provides a lost motion linkage by which the low magnification lens may be moved from a position in optical alignment, as illustrated in FIG. 4, to a position just slightly out of alignment, clear of the image beam, as illustrated by its dot-dash representation in FIG. 4. The amount of rotation of the shaft 66 is controlled by the angular movement needed to move lens 36 into an out of position, which is greater than the rotation needed for the low magnification lens 38, whose motion is limited by the wall of the tube 32. The difference is made up by the lost motion linkage provided by the link 72 and arm 70.

It will here be noted that the arm 70 is generally C-shaped and moves from a position where it abuts the tube 32 to a position which enwraps the mirror 48. The arm 70 is held accurately in position against a stop-member 76 which is carried by and projects outwardly from the sleeve 68. A magnet 77 carried by the arm 70 serves to hold the latter in accurate position against the stop 76. Likewise, the arm 67 carrying the high magnification lens 36 is held in position magnetically against a magnet 80 which is carried by a stop-arm 82 also secured to the sleeve 68.

Control of the magnification is illustrated in FIG. 3. A control arm 84 mounted to the shaft 66 connects by way of a simple crank linkage 85 to the control knob 22. Rotation of the control knob is thereby transmitted as up and down motion to the control lever 84, whereby the shaft 66 is rotated to bring either the high magnification lens 36 or the low magnification lens 38 into position.

In the actual construction of the camera obscura 30 all of the component parts except the film holder 16 and an apertured light screen 31 are mounted on the lens board 35, the mirror 48 being carried by a rearwardly projecting post 92, and the lens system being carried by the sleeve 68.

The mirrors 44 and 46 beneath the stage 42 are carried on a plate 94, which lies to the rear of the apparatus in a vertical plane perpendicular to the mirrors. The plate 94 is in turn carried on a vertical bracket 96 by a pair of screw members 98 which lie in the plane bisecting the angle formed by the planes of the mirrors 44 and 46. These are in turn engaged in slots 99 in the mounting plate 96 which are also aligned with the bisection of the mirrors 44 and 46. The mirrors may accordingly be adjusted by movement in the direction of the plane bisecting them. This movement it will be noted does not alter the direction or location of the optical axis, but only the length thereof. By this means convenient focusing of the system is provided.

In the operation of the camera of this invention it is only necessary to turn on the light by operation of the switch 20 (the electrical system (wiring, switches, ballast, starter and bulb) is entirely conventional and has not been described in detail). A film pack is placed in the film holder. Selection is made as between high and low magnificaton by operation of the knob 22. The proper exposure for the film being used is set by operation of the knob 24 (shown in FIG. 1 as connected by a crank mechanism to the shutter exposure time selector dial of the shutter mechanism). The object to be photographed is placed on the stage behind the door 14. The shutter is then actuated by turning the knob 26 (illustrated in FIG. 1 as connected by a crank lever to the shutter release button of the shutter mechanism). Finally the film is removed and developed; if a Polaroid Land film pack is used this simply requires pulling the combined negative and positive from the film holder, waiting for development to be complete and then peeling the positive from the negative.

From the foregoing explanation it will be appreciated that the art of laboratory photography is greatly simplified as the manipulation and skill, and that photographic representations representing technological improvement over those generally available are provided, by the camera of this invention.

Although this invention has been described with specific reference to its currently preferred embodiment, it is contemplated that modifications will occur to those skilled in the art and familiar with the principles herein disclosed, and that such may be made without departing from the scope of this invention.

Having thus described my invention I claim and desire to secure by Letters Patent:

1. A camera adapted for photography through transparent and liquid media comprising, in combination,
  a horizontal transparent platform adapted to receive an object to be photographed,
  a light source mounted over said platform for illuminating said object,
  a pair of reflective surfaces beneath said platform angularly related to direct an image beam from said object by reflection from both of said surfaces,
  means mounting said reflective surfaces for simultaneous movement in the direction of the plane bisection the angle between them,
  a third reflective surface through which said image beam is reflected, and
  a photographic system including a film holder and lens for focusing said image beam onto a film in said film holder.

2. A camera adapted for photography through transparent and liquid media comprising in combination,
  a horizontal transparent platform adapted to receive an object to be photographed,
  an optical reflective system adapted to transmit a reflected view from the underside of said platform comprising and odd number of reflective surfaces, said reflective system including a pair of reflective surfaces angularly related to direct said view by reflection from both surfaces,
  means mounting said pair of reflective surfaces for simultaneous movement in the direction of a plane bisecting the angle between them, and
  a photographic system including a film holder and lens for focusing said view onto a film in said film holder.

3. Apparatus for the photography of objects through transparent and liquid media comprising
  horizontal transparent platform adapted to receive an object to be photographed,
  an optical reflective system adapted to transmit a reflected view for photographing from the underside of said platform comprising an odd number of reflective surfaces, a photographic system including a film holder and means for photographing same, whereby the photograph viewed from the bottom presents the handedness of a top view.

4. Apparatus for the photogaphy of objects through transparent and liquid media comprising
  a horizontal transparent platform adapted to receive an object to be photographed,
  a light source mounted over said platform for illuminating said object from above, comprising
    inner and outer circular wall members defining an annular channel opening downwardly, and
    a circular lamp within said channel centered over said platform,
  the area within said inner wall member being optically substantially black and covering the field to be photographed, and
  an optical reflective system adapted to transmit a reflected view for photographing from the underside of said platform comprising an odd number of reflective surfaces.

5. Apparatus for the photography of objects through transparent and liquid media comprising
  a horizontal transparent platform adapted to receive an object to be photographed,
  a light source mounted over said platform for illuminating said object from above, comprising
    inner and outer circular wall members defining an annular channel opening downwardly, and
    a circular lamp within said channel centered over said platform,
  the area within said inner wall member being optically substantially black, and covering the field to be photographed,
  a flash tube within said inner wall member, and
  an optical reflective system adapted to transmit a reflected view for photographing from the underside of said platform comprising an odd number of reflective surfaces.

6. A camera adapted for photography through transparent and liquid media comprising, in combination,
  a horizontal transparent platform adapted to receive an object to be photographed,
  a light source mounted over said platform for illuminating said object from above, comprising
    inner and outer circular wall members defining an annular channel opening downwardly, and
    a circular lamp within said channel centered over said platform,
    the are within said inner wall member being optically substantially black, and covering the field to be photographed,
  a pair of reflective surfaces beneath said platform angularly related to direct an image beam from said object by reflection from both of said surfaces,
  means mounting said reflective surfaces for simultaneous movement in the direction of the plane bisecting the angle between them,
  a third reflective surface through which said image beam is reflected, and
  a photographic system including a film holder and lens for focusing said image onto a film in said film holder.

7. Apparatus for the photography of objects through transparent and liquid media comprising, in combination
  a horizontal transparent platform adapted to receive an object to be photographed,
  a light source mounted over said platform for illuminating said object, comprising
    a circular lamp centered over said platform, and
    an inner circular shielding member surrounded by said lamp,
  the area within said shielding member being optically substantially black and covering the field to be photographed, and
  an optical reflective system adapted to transmit a reflected view for photographing from the underside of said platform comprising an odd number of reflective surfaces.

8. Apparatus for the photography of objects through transparent and liquid media comprising, in combination
  a horizontal transparent platform adapted to receive an object to be photographed,
  a light source mounted over said platform for illuminating said object, comprising
    a circular lamp centered over said platform, and
    an inner circular shielding member surrounded by said lamp,
  the area within said shielding member being optically substantially black and covering the field to be photographed,
  a flash tube mounted to illuminate said area, and
  an optical reflective system adapted to transmit a reflected view for photographing from the underside of said platform comprising an odd number of reflective surfaces.

9. Apparatus for the photography of objects through transparent and liquid media comprising, in combination
   a horizontal transparent platform adapted to receive an object to be photographed,
   a light source mounted over said platform for illuminating said object, comprising
      a circular lamp centered over said platform, and
      an inner circular shielding member surrounded by said lamp,
   the area within said shielding member being optically substantially black and covering the field to be photographed,
   a removable white translucent panel mountable between said platform and said light source, and
   an optical reflective system adapted to transmit a reflected view for photographing from the underside of said platform comprising an odd number of reflective surfaces.

10. A high resolution multiple focus camera comprising walls defining a light tight chamber having a shutter controlled opening and a film holder in optical alignment therewith, a first relatively low magnification lens within said chamber movably mounted for positioning into and out of said optical alignment, a second relatively high magnification lens outside said chamber movably mounted for positioning out of and into said optical alignment, and means interconnecting said lenses for selectively positioning one in said optical alignment.

11. A camera adapted for photography through transparent and liquid media comprising in combination
    a horizontal transparent platform adapted to receive an object to be photographed,
    an optical reflective system adapted to transmit a reflective view from the underside of said platform comprising an odd number of reflective surfaces, and
    a light tight chamber having a shutter controlled opening and a film holder, in optical alignment with said reflected view,
    a first lens within said chamber movably mounted for positioning into and out of said optical alignment,
    a second lens between said shutter and said platform movably mounted for positioning out of and into said optical alignment, and
    means interconnecting said lenses for selectively positioning either one in said optical alignment.

12. A high resolution multiple focus camera comprising walls defining a light tight chamber having a shutter controlled opening and a filmholder in optical alignment therewith, a first lens within said chamber movably mounted for positioning into and out of said optical alignment, a second lens outside said chamber movably mounted for positioning out of and into said optical alignment, and means interconnecting said lenses for selectively positioning either one in said optical alignment.
   said means comprising a sleeve extending through the wall of said chamber,
   a shaft extending through said sleeve and beyond each end thereof,
   a first arm mounted on the inside end of said shaft and attached to said first lens,
   a second arm mounted on the outside end of said shaft and attached to said second lens,
   said arms being angularly related so that rotation of said shaft in one direction moves said first lens into optical alignment and rotation in the other direction moves said second lens into optical alignment.

13. A camera adapted for photography through transparent and liquid media comprising, in combination,
    a horizontal transparent platform adapted to receive an object to be photographed,
    a light source mounted over said platform for illuminating said object from above,
    a pair of reflective surfaces beneath said platform angularly related to direct an image beam from said object by reflection from both of said surfaces,
    means mounting said reflective surfaces for simultaneous movement in the direction of the plane bisecting the angle between them, and
    a photographic system including side walls defining a light tight chamber extending vertically beside said platform terminating at its upper end in a film holder, a shutter mounted in a side wall in a lower portion of said chamber, in line with said image beam, a third reflective surface mounted to reflect said image beam to said film holder, and a lens focusing said beam onto a film in said holder.

14. A camera adapted for photography through transparent and liquid media comprising, in combination,
    a horizontal transparent platform adapted to receive an object to be photographed,
    an optical reflective system adapted to transmit a reflective view from the underside of said platform comprising an odd number of reflective surfaces, said reflective system including a pair of reflective surfaces angularly related to direct said view by reflection from both surfaces,
    means mounting said pair of reflective surfaces for simultaneous movement in the direction of a plane bisecting the angle between them, and
    a photographic system, optically aligned with said reflected view, including side walls defining a light tight chamber terminating at one end in a film holder, a shutter mounted in a side wall of said chamber in line with said image beam, and a third reflective surface within said chamber mounted to reflect said beam to said film holder.

15. A camera adapted for photography through transparent and liquid media comprising, in combination,
    a horizontal transparent platform adapted to receive an object to be photographed,
    a light source mounted over said platform for illuminating said object from above,
    a pair of reflective surfaces beneath said platform angularly related to direct an image beam from said object by reflection from both of said surfaces, and
    a photographic system including side walls defining a light tight chamber extending vertically beside said platform terminating at its upper end in a film holder, a shutter mounted in a side wall in a lower portion of said chamber, in line with said image beam, a third reflective surface mounted to reflect said image beam to said film holder, and a lens focusing said beam onto a film in said holder, whereby the photograph viewed from the bottom presents the handedness of a top view.

16. A camera adapted for photography through transparent and liquid media comprising, in combination,
    a horizontal transparent platform adapted to receive an object to be photographed,
    an optical reflective system adapted to transmit a reflected view from the underside of said platform comprising an odd number of reflective surfaces, said reflective system including a pair of reflective surfaces angularly related to direct said view by reflection from both surfaces, and
    a photographic system optically aligned with said reflected view, including side walls defining a light tight chamber terminating at one end in a film holder, and a shutter mounted in a side wall of said chamber in line with said image beam, whereby the photograph viewed from the bottom presents the handedness of a top view.

17. Apparatus for the photography of objects through transparent and liquid media comprising a horizontal transparent platform adapted to receive an object to be photographed, a light source mounted over said platform for illuminating said object from above, and an optical reflective system adapted to transmit a reflected view for photographing from the underside of said platform comprising and odd number of reflective surfaces, and a photographic system including a film holder and lens optically aligned with said reflective system for focusing said image onto a film in said film holder, whereby the photograph viewed from the bottom presents the handedness of a top view.

18. Apparatus for the photography of objects through transparent and liquid media comprising, in combination a horizontal transparent platform adapted to receive an object to be photographed, a light source mounted over said platform for illuminating said object, comprising a circular lamp centered over said platform, and an inner circular shielding member surrounded by said lamp, the area within said shielding member being optically substantially black and covering the field to be photographed, and an optical reflective system adapted to transmit a reflected view for photographing from the underside of said platform comprising an odd number of reflective surfaces, and a photographic system including a film holder and lens optically aligned with said reflective system for focusing said image onto a film in said film holder.

19. Apparatus for the photography of objects through transparent and liquid media comprising, in combination a horizontal transparent platform adapted to receive an object to be photographed, a light source mounted over said platform for illuminating said object, comprising a circular lamp centered over said platform, and an inner circular shielding member surrounded by said lamp, the area within said shielding member being optically substantially black and covering the field to be photographed, and a photographic system including a film holder and lens optically aligned for focusing an image from the bottom of said platform onto a film in said film holder.

20. Apparatus for the photography of objects through transparent and liquid media comprising a horizontal transparent platform adapted to receive an object to be photographed, a light source mounted over said platform for illuminating said object from above, comprising inner and outer circular wall members defining an annular channel opening downwardly, and a circular lamp within said channel centered over said platform, the area within said inner wall member being optically substantially black and covering the field to be photographed, and a photographic system including a film holder and lens optically aligned for focusing an image from the bottom of said platform onto a film in said film holder.

References Cited
UNITED STATES PATENTS

| | | | |
|---|---|---|---|
| 2,889,741 | 6/1959 | Luz | 88—24 |
| 3,216,317 | 11/1965 | Nail | 88—24 |

NORTON ANSHER, Primary Examiner.

R. A. WINTERCORN, Assistant Examiner.